United States Patent [19]

Nicollini

[11] Patent Number: 5,754,417
[45] Date of Patent: May 19, 1998

[54] LINEARLY REGULATED VOLTAGE MULTIPLIER

[75] Inventor: Germano Nicollini, Piazcenza, Italy

[73] Assignee: SGS-Thomson Microelectronics S.r.l., Agrate Brianza, Italy

[21] Appl. No.: 739,525

[22] Filed: Oct. 29, 1996

[30] Foreign Application Priority Data

Oct. 31, 1995 [EP] European Pat. Off. ............ 95830460

[51] Int. Cl.⁶ .................... H02M 3/18; H03K 3/00
[52] U.S. Cl. ............................. 363/60; 327/536
[58] Field of Search ............. 363/59, 60; 327/535, 327/536; 330/297, 96

[56] References Cited

U.S. PATENT DOCUMENTS

| | | | |
|---|---|---|---|
| 4,425,550 | 1/1984 | Smith et al. | 330/107 |
| 5,239,455 | 8/1993 | Fobbester et al. | 363/60 |
| 5,404,053 | 4/1995 | Poma et al. | 327/108 |
| 5,589,793 | 12/1996 | Kassapian | 327/536 |

FOREIGN PATENT DOCUMENTS

| | | |
|---|---|---|
| 0 540 948 A2 | 5/1993 | European Pat. Off. . |
| 0 631 369 A1 | 12/1994 | European Pat. Off. . |

*Primary Examiner*—Matthew V. Nguyen
*Attorney, Agent, or Firm*—David V. Carlson; Robert E. Mates; Seed and Berry LLP

[57] ABSTRACT

A regulating circuit for the output voltage of a voltage booster, of the type which comprises a first charge transfer capacitor adapted to draw electric charges from the supply terminal and transfer them to the output terminal, through electronic switches controlled by non-overlapped complementary phase signals, and a second charge storage capacitor connected between the output terminal and ground, further comprises an error amplifier which generates, during one of the operational phases, a DC voltage corresponding to the difference between a reference voltage and a divided voltage of the output voltage of the voltage booster; this DC voltage is applied directly to one end of the transfer capacitor.

27 Claims, 3 Drawing Sheets

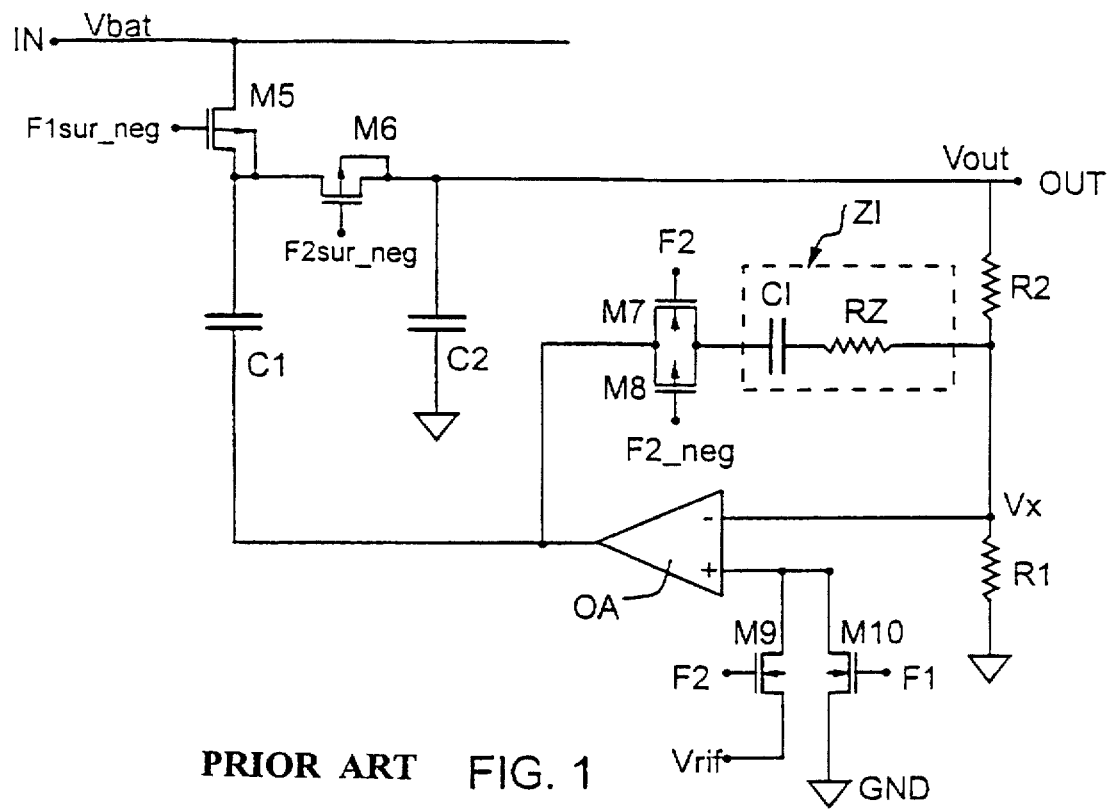
PRIOR ART FIG. 1
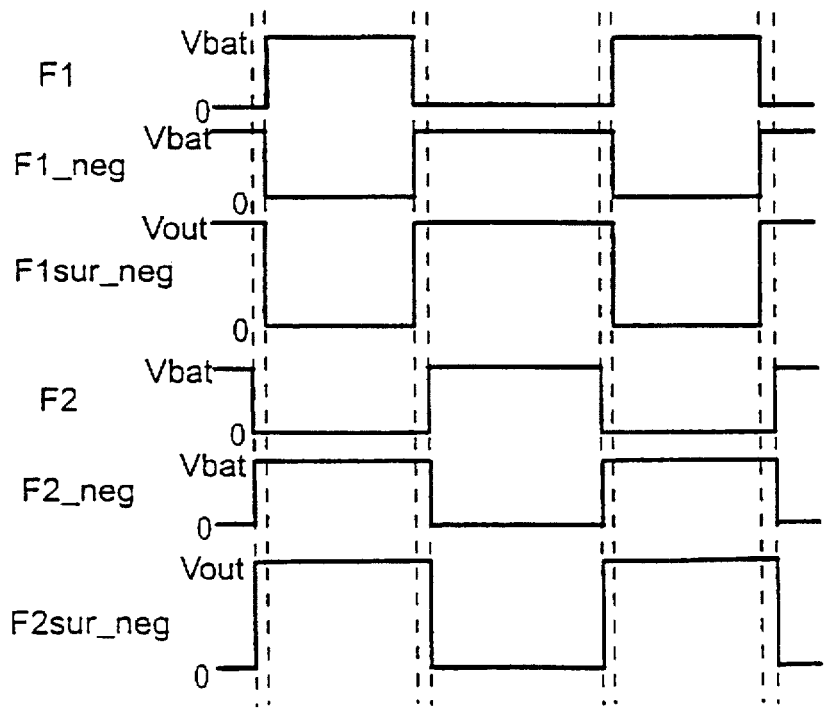
FIG. 2 PRIOR ART

LINEARLY REGULATED VOLTAGE MULTIPLIER

TECHNICAL FIELD

This invention relates to a voltage multiplier having an output voltage regulating circuit.

BACKGROUND OF THE INVENTION

Electronic systems quite often require that higher voltages than the supply voltage be generated internally thereof This is the case, for example, with EEPROM memories, which require write voltages well above the conventional 5-volt supply, or with devices powered from low-voltage batteries, typically at 3 volts or less. The circuit that serves this function is known as the charge pump, voltage multiplier or booster circuit, and is preferably provided within the integrated circuit.

A conventional booster circuit, which is utilized in integrated circuits requiring a supply voltage multiplication factor of two, or at least an elevated supply voltage, comprises a charge transfer capacitor, which is switched by means of electronic switches driven by two phases of a clock generator, and a charge storage capacitor.

That circuit can output fairly large currents (of up to a few tens of mA), and accordingly, is capable of generating a boosted voltage for supply to the integrated circuit as a whole or to a significant portion thereof.

The clock generator utilized in association with that booster circuit generates two non-overlapping complementary phase signals. During the first phase, a supply voltage is applied to a first terminal of the transfer capacitor, while a second terminal of that same capacitor is connected to ground. During the second phase, the first terminal is cut off from the supply voltage, while the second terminal is disconnected from ground and connected to the supply voltage. In this way, the first terminal of the charge transfer capacitor is brought to a voltage level twice as high as the supply voltage. This boosted voltage is used for charging a charge storage capacitor. At the end of the second phase, the first terminal of the charge transfer capacitor is disconnected from the storage capacitor and coupled back to the supply voltage. The voltage that appears on the charge storage capacitor is the boosted output voltage from the voltage booster.

With a zero current delivery, the output voltage Vout would obviously be twice as high as the supply voltage and become perfectly stable already after a few clock cycles. However, in the presence of a current on the load, the value of the output voltage is affected by the voltage drops across the capacitors and the switches provided for switching the capacitors. These voltage drops vary with the value of the output current, the process used, and the operating temperature. Further, any variations in the supply voltage, such as are typical to occur in systems powered from nickel-cadmium batteries, reflect on the booster output voltage, doubled or at least amplified in magnitude.

It is quite often desirable, or even necessary, that the boosted output voltage be held constant as the current on the load and the value of the supply voltage Vbat vary. In such cases, the output voltage must be stabilized by a specially provided regulating circuit.

One prior solution which includes a circuit for providing a stabilized output voltage is disclosed in European Patent Application No. 92118084.0 filed on Oct. 22, 1992 by Motorola, Inc. and published under No. 0540948 on May 12, 1993.

The voltage booster disclosed in that patent application is of the same type as that just described, and the regulating circuit therein is implemented by a negative output voltage regulating loop.

The regulating loop is provided by an integrator adapted to generate a DC error signal which is proportional to the difference between the output voltage from the voltage booster and a reference voltage. This error signal is used to drive (at a conduction phase of the booster circuit operational cycle) the control gate of a MOS transistor, which functions as a switch to connect the charge transfer capacitor to the supply voltage, by controlling its internal resistance, and hence, the charge time constant of the capacitor. In this way, the output voltage of the voltage booster circuit can be held constant, in the steady state condition, at a proportional value to the reference voltage.

A major problem encountered with this prior solution is that the dependence of the voltage applied to the control gate of a MOS transistor on the internal resistance of the latter is markedly non-linear. The presence of this non-linear element makes the regulating loop non-linear. As persons of ordinary skill in the art will readily recognize, a non-linear feedback loop may pose significant "lockup" problems, i.e., problems with the attainment of the proper output voltage value from the moment the circuit is turned on, and problems with holding this output voltage constant against the occurrence of sharp current variations on the load.

Another prior solution, disclosed in European Patent Application No. 94830413.4 filed on Aug. 31, 1994 by SGS-Thomson Microelectronics srl, provides a voltage booster including a linear type of output voltage regulating circuit.

This patent application describes a voltage booster circuit, illustrated in some detail by FIG. 1, of a type comprising a charge transfer capacitor C1 which is switched, similar to the previously discussed circuit, between two phases of a clock signal, so as to have a charge storage capacitor C2 charged at a boosted voltage Vout relative to the booster supply voltage Vbat. The output voltage is controlled by a linear regulating loop which comprises an integrator adapted to generate an error signal of the difference between a reference voltage Vrif and a proportional voltage Vx to the output voltage Vout. This error signal is applied, during one of the two operational phases, directly to the bottom plate of the charge transfer capacitor C1 so as to supply a variable voltage on that plate which allows the output voltage to be held at a constant value.

The integrator comprises an operational amplifier OA whose inverting input is connected to the center node of a voltage divider R1–R2 and to the output of the amplifier through a series of a resistor RZ, an integration capacitor CI, and a transfer switch or gate M7–M8. The resistor RZ and integration capacitor CI together are labeled in FIG. 1 as ZI and form an integrating feedback loop for the operational amplifier OA. The non-inverting input is connected, through a switch M9, to a reference voltage Vrif, and through another switch M10, to a ground potential.

Plotted in FIG. 2 are timing diagrams for the control phases utilized in the circuit of FIG. 1.

As can be seen, phases F1 and F2 are non-overlapping complementary phases, phase F1_neg is substantially coincident with phase F1sur_neg, and phase F2_neg is essentially coincident with phase F2sur_neg. The phases F1sur_neg and F2sur_neg are commonly generated by a timing circuit being supplied from the voltage Vout which is a boosted voltage relative to the supply voltage Vbat. In other words, the drive phases F1sur_neg and F2sur_neg are boosted phases.

The MOS transistors M5 and M6 are driven by the phase signals F1sur_neg and F2sur_neg, the transistors M7 and M8 are driven by the phase signal F2 and its complement, the transistor M9 is driven by the phase signal F2, and the transistor M10 is driven by the phase signal F1.

During the phase F1, the bottom plate of the capacitor C1 is forced to ground potential by the operational amplifier OA having its feedback loop open and non-inverting input connected to ground, while the top plate of the capacitor C1 is connected to the supply voltage Vbat. In this way, the capacitor C1 will be charged at the voltage Vbat.

During the phase F2, the non-inverting input of the operational amplifier OA is brought to the voltage Vrif by the closed transistor M9, and concurrently therewith, the feedback loop of the amplifier OA is closed. Thus, the output voltage from the amplifier OA will reach a proportional value to the integral of the error between the voltage Vrif and the voltage Vx=Vout*R1/(R1+R2). The bottom plate of the capacitor C1 will, therefore, be at a suitable voltage value to bring the output voltage to the desired value.

$$Vout=Vrif*(R1+R2)/R1)$$

The initial settling time period upon turning on this circuit, being typically on the order of 500 microseconds, is a relatively short one compared to the settling time period of the previously discussed voltage boosters.

These voltage booster circuits are usually integrated on the same slice of semiconductor material, or chip, along with the electronic devices to be powered thereby. In the circuit of FIG. 1, as well as in the other circuits previously discussed, the two capacitors C1 and C2 typically cannot be integrated because they would occupy too large an amount of the chip area due to their high capacitance value. All the other components, namely the operational amplifier OA, MOS transistors utilized as electronic switches, resistors, and integration capacitor CI, are instead integrated on the chip. However, the integrated circuit components of FIG. 1 occupy a relatively large area on the chip.

SUMMARY OF THE INVENTION

According to the principles of the present invention, there is provided a voltage multiplier or booster for relatively large output currents, which includes a linear type of output voltage regulating circuit, has a very short settling time, and has a simpler circuit construction than prior art devices, so as to facilitate its integration on silicon and afford a significant saving in chip area.

The booster circuit of this invention can be used for powering semiconductor electronic devices whose supply voltage needs boosting; by reason of its small size, the inventive circuit being advantageously integratable along with the circuit that it is expected to power.

According to one embodiment of the present invention, there is provided a charge pump circuit having an input terminal for receiving a supply voltage and an output terminal for providing a boosted voltage with respect to the supply voltage. The circuit includes a charge transfer capacitor, charge storage capacitor, resistor, first and second switches and an error amplifier. The first switch receives the supply voltage and charges the charge transfer capacitor which is connected to the output of the error amplifier. The second switch transfers the stored charge from the charge transfer capacitor to the charge storage capacitor. The resistor is connected between the output terminal of the charge pump circuit and an inverting input of the error amplifier. The non-inverting input is connectable to ground or a reference voltage. During the charge transfer, the charge transfer capacitor and the resistor define an integrating feedback loop for the operational amplifier. The charge transfer capacitor and the resistor integrates the difference between the reference voltage at the non-inverting input and the voltage at the inverting input, thereby eliminating the use of a separately provided integrating capacitor.

The features and advantages of a circuit according to the invention will be apparent from the following detailed description of an embodiment thereof, given by way of non limitative example with reference to the accompanying drawings.

BRIEF DESCRIPTION OF THE DRAWINGS

FIG. 1 shows a functional diagram of a voltage booster circuit provided with an output voltage regulating circuit, according to the prior art.

FIG. 2 shows the waveform of the drive phases utilized in the circuit of FIG. 1.

DETAILED DESCRIPTION OF THE INVENTION

Figure 3:
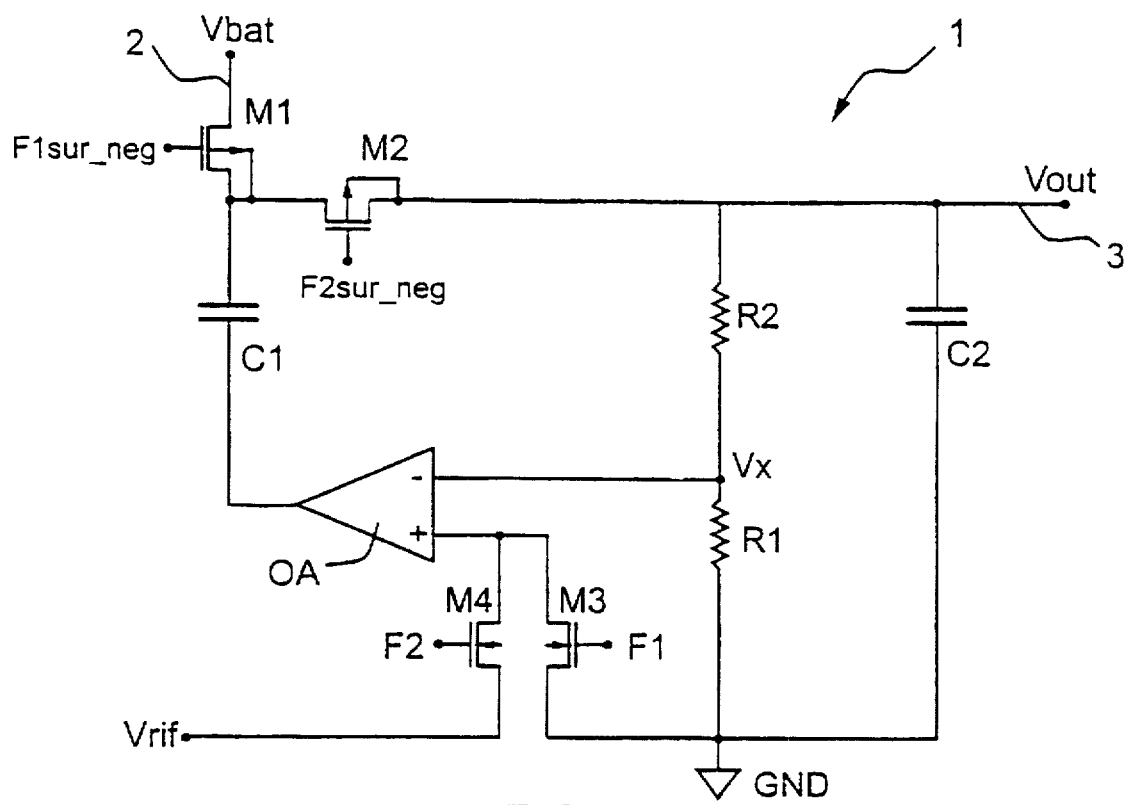
FIG. 3 shows a functional diagram of a voltage booster provided with an output voltage regulating circuit, according to the present invention.

With reference to the drawing figures, and in particular FIG. 3, generally shown at 1 is a voltage booster which embodies the invention. This booster comprises a charge transfer capacitor C1 which is switched, as by means of electronic switches controlled by two phases of a clock signal generator (not shown), for charging a charge storage capacitor C2 at a boosted voltage Vout with respect to the supply voltage Vbat.

The four transistors M1, M2, M3 and M4 serving as electronic switches are transistors of the MOS type, and have each a source terminal, a drain terminal, a gate or control terminal, and a substrate contact. In particular, the transistors M1 and M2 are p-channel MOS transistors, whereas the transistors M3 and M4 are n-channel MOS transistors.

A first one, M1, of the MOS transistors has its source terminal connected to the supply terminal 2 of the booster, its drain terminal and substrate contact connected to a first terminal of the charge transfer capacitor C1, and receives a first clock signal F1sur_neg on its gate terminal. The first terminal of the capacitor C1 is also connected to the source of a second MOS transistor, M2, driven by a second clock signal F2sur_neg. The second transistor M2 has its drain terminal and substrate contact connected to the output terminal 3 of the booster. Connected across the output terminal 3 and a ground reference GND of the circuit are the charge storage capacitor C2 and a voltage divider formed by the two resistors R1 and R2. The intermediate node between the two resistors, R1 and R2, is connected to an inverting terminal of an operational amplifier OA. A non-inverting input of the operational amplifier OA is connected, through a third transistor M3 driven by a third clock signal F1, to the ground reference GND, and through a fourth transistor M4 driven by a fourth clock signal F2, to a voltage reference Vrif. The output of the operational amplifier OA is connected to a second terminal of the charge transfer capacitor C1.

Figure 4:
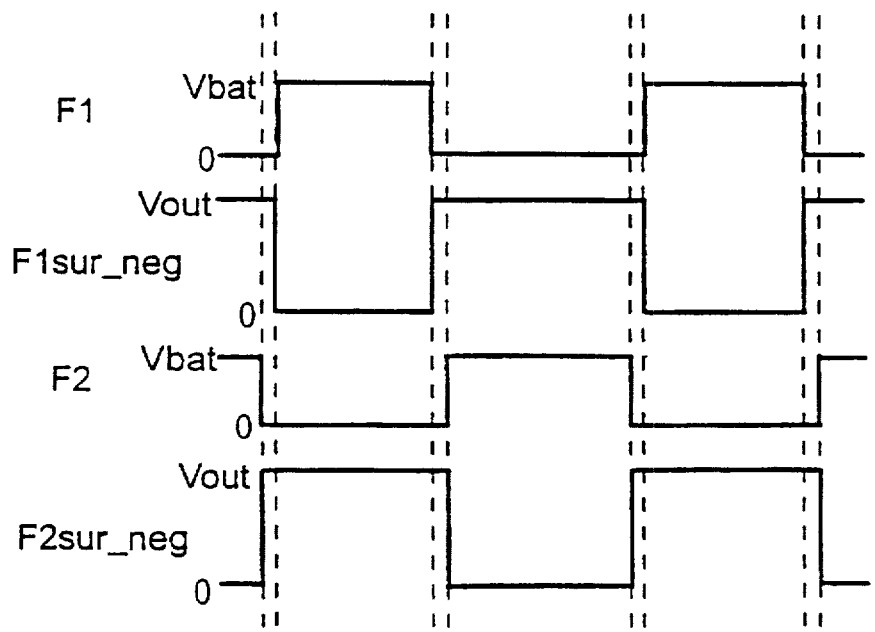
FIG. 4 shows the waveform of the drive phases utilized in the circuit of FIG. 3.

The clock signals F1, F2, F1sur_neg and F2sur_neg are generated by a non-overlapped phase clock signal generator of a conventional type, and are indicated on the timing diagram of FIG. 4. The signals F1 and F2 are non-overlapped signals because only one signal is active at any one time. The signals F1 and F2 are non-overlapped phase signals complementary of each other, the signal F1sur_neg is a negated signal which is voltage-boosted with respect to the signal F1, and F2sur_neg is a negated and voltage-boosted signal with respect to the signal F2. The logic level of the voltage-boosted signals is equal to the boosted voltage Vout present at the voltage booster output.

During the active phase of F1, the transistors M1 and M3 are in the conduction state, whereas the transistors M2 and M4 are in the cutoff state. The first terminal of the capacitor C1 is connected to the supply voltage, while its other terminal is forced to ground potential by the operational amplifier OA having its non-inverting input connected to ground. The capacitor C1 is, therefore, charged at the voltage Vbat during the active phase of F1.

During the active phase of F2, the transistors M1 and M3 are cut off, and the transistors M2 and M4 are conducting; the first terminal of the capacitor C1, disconnected from the supply terminal 2, is connected to the output terminal 3 of the booster, while the second terminal is brought to the potential present at the output of the operational amplifier OA. During this phase, the operational amplifier OA functions, in combination with the capacitor C1 and the resistors R1 and R2, as an error amplifier to integrate the difference between the reference voltage Vrif and the voltage Vx present at the center node of the divider R1–R2. In particular, with the transistor M2 in the conducting state, the capacitor C1 and resistor R2 form a feedback loop between the output and the inverting input of the amplifier OA. The conduction resistance of the transistor M2 is much lower than the resistance of R2, and therefore, negligible. The non-inverting input of the amplifier OA is connected, through the transistor M4, to the voltage reference Vrif.

The voltage Vrif is set by a conventional voltage generator (not shown) effective to supply a voltage which is stable versus temperature and independent of any variations in the supply voltage, while the voltage Vx is a duplicate of the output voltage Vout as given by the following formula:

$$Vx=Vout*R1/(R1+R2)).$$

The high value of the DC gain of the feedback loop of the operational amplifier OA forces the output voltage Vout to attain the value sought, namely:

$$Vout=Vrif*((R1+R2)/R1).$$

Figure 5:
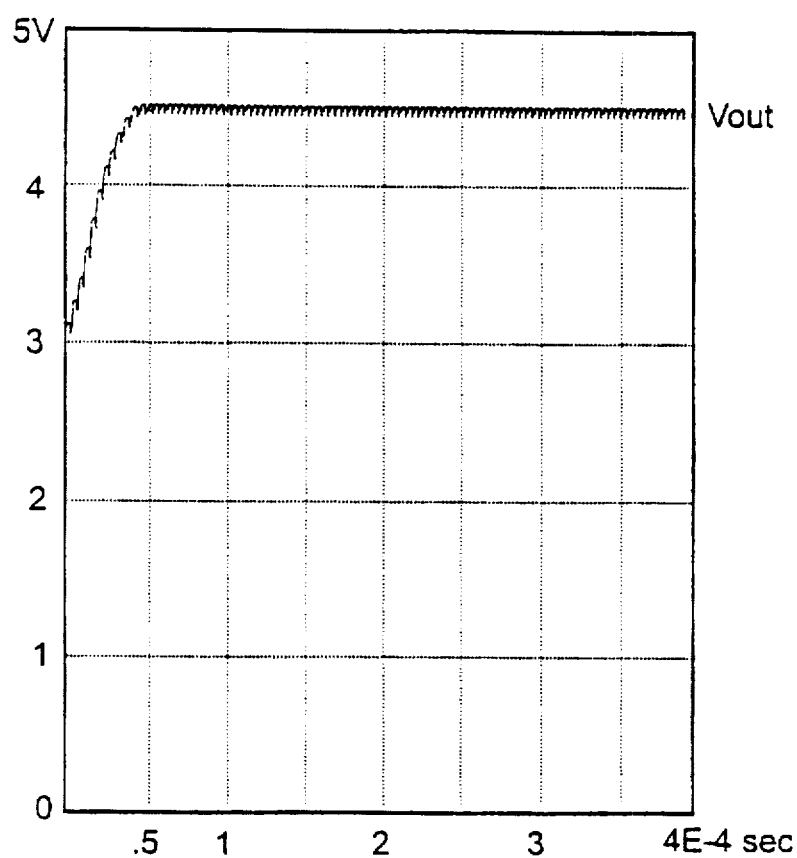
FIG. 5 is a timing diagram of the output voltage from the voltage booster circuit shown in FIG. 3.

By suitably selecting the resistances of R1 and R2, the output voltage Vout can be regulated for the desired value. By virtue of the linearity and the simplicity of the regulating circuit, this output voltage value is attained, upon turning on the circuit, within a very short time period, as indicated by the timing diagram of FIG. 5. That diagram illustrates the pattern for the output voltage Vout over time, after the circuit is turned on.

In particular, it can be seen that the output voltage Vout rises to the desired value of 4.45 volts, from an initial voltage of 3 volts being the equal of the circuit supply voltage, within 50 microseconds, a far shorter time than the 500 microseconds required by the conventional booster previously discussed and shown in FIG. 1.

Another advantage of the inventive booster circuit over the foregoing conventional circuits comes from its simple construction, resulting in a significant saving of silicon area at the time of its integration. A comparison of this circuit with the booster circuit of FIG. 1 brings out that fewer components are used in the former: in particular, the integration capacitor CI, resistor RZ, and electronic switch formed of the transistors M7 and M8 have been eliminated. These components jointly accounted, in the previous integrated circuit, for approximately 50% of the overall area occupied by the voltage booster circuit. Accordingly, the integration area for the booster circuit of this invention can be greatly reduced.

Furthermore, compared to the conventional booster circuit of FIG. 1—which uses six different clock signals, as shown in FIG. 2—the circuit of this invention uses only four clock signals, F1, F2, F1sur_neg and F2sur_neg. This allows the circuitry employed for implementing the clock signal generator to be also simplified.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A charge pump circuit having an input terminal for receiving a supply voltage and an output terminal for providing a boosted voltage with respect to the supply voltage, the charge pump circuit comprising:

a charge transfer capacitor having first and second terminals;

a first switch connected between the first terminal of the charge transfer capacitor and the input terminal;

a charge storage capacitor connected between the output terminal and a first voltage reference;

a second switch connected between the first terminal of the charge transfer capacitor and the output terminal;

a first resistor connected to the output terminal; and an error amplifier including:

an operational amplifier having a first input terminal coupled to the output terminal of the charge pump circuit, a second input terminal coupled to a second voltage reference, and an output line connected solely to the second terminal of the charge transfer capacitor and not directly connected to any other components; and a single feedback loop comprising the charge transfer capacitor, the second switch, and the first resistor connected between the first input terminal and the output line of the operational amplifier, the operational amplifier and the single feedback loop forming an integrator to integrate a difference between the second voltage reference and a voltage at the first input terminal of the operational amplifier based on the boosted voltage.

2. The circuit according to claim 1, further comprising:

a third switch positioned between the second input terminal of the operational amplifier and the first voltage reference for coupling the second input terminal of the operational amplifier to the first voltage reference; and a fourth switch positioned between the second input terminal of the operational amplifier and the second voltage reference for coupling the second input terminal of the operational amplifier to the second voltage reference.

3. The circuit according to claim 2, further comprising a second resistor connected in series between the first resistor and the first voltage reference, the first and second resistors defining a voltage divider.

4. The circuit according to claim 3 wherein the first input terminal of the operational amplifier is an inverting input terminal and the second input terminal of the operational amplifier is a non-inverting input terminal.

5. The circuit according to claim 2 wherein the third and fourth switches are respectively controlled by third and fourth clock signals which are non-overlapped signals.

6. The circuit according to claim 5 wherein the first and second switches are respectively controlled by first and second clock signals in which the first clock signal is a voltage-boosted logic signal complementary to the third clock signal and the second clock signal is a voltage-boosted logic signal complementary to the fourth clock signal.

7. A charge pump circuit for use in an integrated semiconductor device, the charge pump circuit having an input terminal for receiving a supply voltage and an output terminal for providing a boosted voltage with respect to the supply voltage, the charge pump circuit comprising:

a charge transfer capacitor having first and second terminals;

a first switch connected between the first terminal of the charge transfer capacitor and the input terminal, the first switch being controlled by a first clock signal to couple the input terminal to the first terminal of the charge transfer capacitor in order to charge the charge transfer capacitor;

a charge storage capacitor connected between the output terminal and a first voltage reference;

a second switch connected between the first terminal of the charge transfer capacitor and the output terminal, the second switch being controlled by a second clock signal to couple the first terminal of the charge transfer capacitor to the output terminal in order to transfer the charge in the charge transfer capacitor to the charge storage capacitor;

a first resistor connected to the output terminal; and an error amplifier including:

an operational amplifier having a first input terminal coupled to the output terminal of the charge pump circuit through the first resistor, a second input terminal coupled to a second voltage reference, and an output terminal connected to the second terminal of the charge transfer capacitor, wherein the charge transfer capacitor, the second switch, and the first resistor comprise a single integrating feedback loop connected between the first input terminal and the output terminal of the operational amplifier when the second switch couples the first terminal of the charge transfer capacitor to the output terminal wherein the single integrating feedback loop is the only feedback loop connected between the first input terminal and the output terminal of the operational amplifier.

8. The circuit according to claim 7, further comprising:

a third switch coupled between the second input terminal of the operational amplifier and the first voltage reference, the third switch being controlled by a third clock signal to couple the second input terminal of the operational amplifier to the first voltage reference; and a fourth switch coupled between the second input terminal of the operational amplifier and the second voltage reference, the fourth switch being controlled by a fourth clock signal to couple the second input terminal of the operational amplifier to the second voltage reference.

9. The circuit according to claim 8, further comprising a second resistor connected in series between the first resistor and the first voltage reference, the first and second resistors defining a voltage divider.

10. The circuit according to claim 9 wherein the first input terminal of the operational amplifier is an inverting input terminal and the second input terminal of the operational amplifier is a non-inverting input terminal.

11. The circuit according to claim 8 wherein the third and fourth clock signals are non-overlapped phase logic signals.

12. The circuit according to claim 11 wherein the first clock signal is a voltage-boosted logic signal complementary to the third clock signal and the second clock signal is a voltage-boosted logic signal complementary to the fourth clock signal.

13. A voltage booster having an input terminal for receiving a supply voltage and an output terminal for supplying a boosted voltage with respect to the supply voltage, comprising:

a charge transfer capacitor;

a first switch controlled by a first drive signal to couple a first terminal of said charge transfer capacitor to the input terminal;

a second switch controlled by a second drive signal to couple the first terminal of said charge transfer capacitor to the output terminal;

a charge storage capacitor connected between the output terminal and a first voltage reference;

an error amplifier comprising an operational amplifier having a first input terminal coupled to the output terminal, a second input terminal coupled to the first voltage reference through a third switch controlled by a third drive signal and coupled to a second voltage reference through a fourth switch controlled by a fourth drive signal, and an output terminal coupled to a second terminal of said charge transfer capacitor; and a single integrating feedback loop comprising the charge transfer capacitor, the second switch, and the output terminal coupled between the first input terminal and the output terminal of the operational amplifier.

14. The voltage booster according to claim 13 wherein the first input terminal of the operational amplifier is an inverting input terminal and the second input terminal of the operational amplifier is a non-inverting input terminal.

15. The voltage booster according to claim 14 wherein the inverting input terminal of the operational amplifier is coupled to the output terminal through a voltage divider.

16. The voltage booster according to claim 15 wherein the voltage divider comprises a first resistor and a second resistor connected in series between the output terminal and the first voltage reference, a common terminal between the first and second resistors being connected to the inverting input terminal of the operational amplifier.

17. The voltage booster according to claim 16 wherein the charge transfer capacitor, the second switch, the output terminal, and the first resistor form the only integrating feedback loop for the operational amplifier connected between the output terminal and the inverting input terminal of the operational amplifier.

18. The voltage booster according to claim 17 wherein the third and fourth drive signals are non-overlapped phase logic signals.

19. The voltage booster according to claim 18 wherein the first drive signal is a voltage-boosted logic signal complementary of the third drive signal, and the second drive signal is a voltage-boosted logic signal complementary of the fourth drive signal.

20. The voltage booster according to claim 13 wherein the first and second switches are p-channel MOS transistors, and the third and fourth switches are n-channel MOS transistors.

21. The voltage booster according to claim 13 wherein the first voltage reference is a ground voltage reference.

22. A charge pump circuit having an input terminal coupled to receive a supply voltage and an output terminal for providing a boosted voltage with respect to the supply voltage, the charge pump circuit comprising:

an amplifier having a first input, a second input and an output line, the output line having only a single integrated component directly connected thereto;

a charge transfer capacitor having a first terminal coupled to the input terminal for receiving the supply voltage and a second terminal directly connected to the output line of the amplifier, the charge transfer capacitor being that single integrated component directly connected to the output line;

a charge storage capacitor connected to the output terminal for retaining the boosted voltage;

a first switch coupled between the first terminal of the charge transfer capacitor and the output terminal for coupling the first terminal of the charge transfer capacitor to the charge storage capacitor to provide the boosted voltage to the output terminal; and an integrator comprising the amplifier having the first input coupled to the output terminal through a first resistor, the integrator integrating a difference between a voltage at the first input of the amplifier and a first reference voltage when the first switch is in a conducting state to generate an error signal at the output of the amplifier, the error signal being coupled to the second terminal of the charge transfer capacitor to regulate the boosted voltage, the charge transfer capacitor being the sole element directly connected to the amplifier output line.

23. The circuit according to claim 22 wherein the first switch, the charge transfer capacitor and the first resistor provide the sole feedback loop between the amplifier output line and the first input terminal of the amplifier.

24. The circuit according to claim 22 wherein the amplifier comprises an operational amplifier having an inverting input connected to the first resistor and a second resistor, a non-inverting input coupled to the first reference voltage through a second switch, and an output coupled to the second terminal of the charge transfer capacitor, the second resistor being connected between the first resistor and a ground voltage reference.

25. The circuit according to claim 22, further comprising:

a third switch coupled between the input terminal and the first terminal of the charge transfer capacitor; and a fourth switch coupled between the non-inverting input of the operational amplifier and the ground voltage reference.

26. A method for providing a boosted voltage to an output terminal of a charge pump circuit coupled to receive a supply voltage, the method comprising:

coupling the supply voltage to a first plate of a charge transfer capacitor through a first switch by rendering the first switch conductive during a first period;

rendering the first switch non-conductive and coupling the first plate of the charge transfer capacitor to the output terminal and to a charge storage capacitor through a second switch by rendering the second switch conductive during a second period to provide the boosted voltage to the output terminal; and generating an error signal by integrating a difference between a voltage based on the boosted voltage and a reference voltage through an amplifier and a single integrating feedback loop comprising the charge transfer capacitor, the second switch, and a voltage divider coupled to the output terminal; and regulating the boosted voltage during the second period by applying the error signal to a second plate of the charge transfer capacitor from an output terminal of the amplifier.

27. The method according to claim 26 wherein the act of regulating the boosted voltage further comprises:

dividing the boosted voltage in the voltage divider to generate a divided voltage;

applying the divided voltage to an inverting input of the amplifier;

applying the reference voltage to a non-inverting input of the amplifier;

generating the error signal at an output of the amplifier by integrating a difference between the divided voltage and the reference voltage through the single integrating feedback loop.

* * * * *